United States Patent [19]
Raber et al.

[11] 3,811,122
[45] May 14, 1974

[54] SUPERVISED BATTERY POWER SUPPLY
[75] Inventors: Samuel Raber, Allendale; Alan M. Heim, Florham Park, both of N.J.
[73] Assignee: Baker Industries, Inc., Cedar Knolls, N.J.
[22] Filed: June 23, 1972
[21] Appl. No.: 265,561

[52] U.S. Cl. .................................. 340/249, 320/48
[51] Int. Cl. ............................................ G08b 21/00
[58] Field of Search ...................... 340/249; 320/48

[56] References Cited
UNITED STATES PATENTS
3,118,137  1/1964  Vincent ............................ 340/249
3,321,754  5/1967  Grimm et al. ...................... 340/249
3,505,663  4/1970  Yule .............................. 340/249 X Primary Examiner—John W. Caldwell
Assistant Examiner—Daniel Myer
Attorney, Agent, or Firm—Edward T. Connors

[57] ABSTRACT

A circuit for indicating the presence or condition of a battery in which the battery while present or in good condition is used as a current by-pass to control an alarm circuit. The circuit is operative irrespective of whether or not a battery charger is connected to the battery.

7 Claims, 1 Drawing Figure

3,811,122
Patented May 14 1974
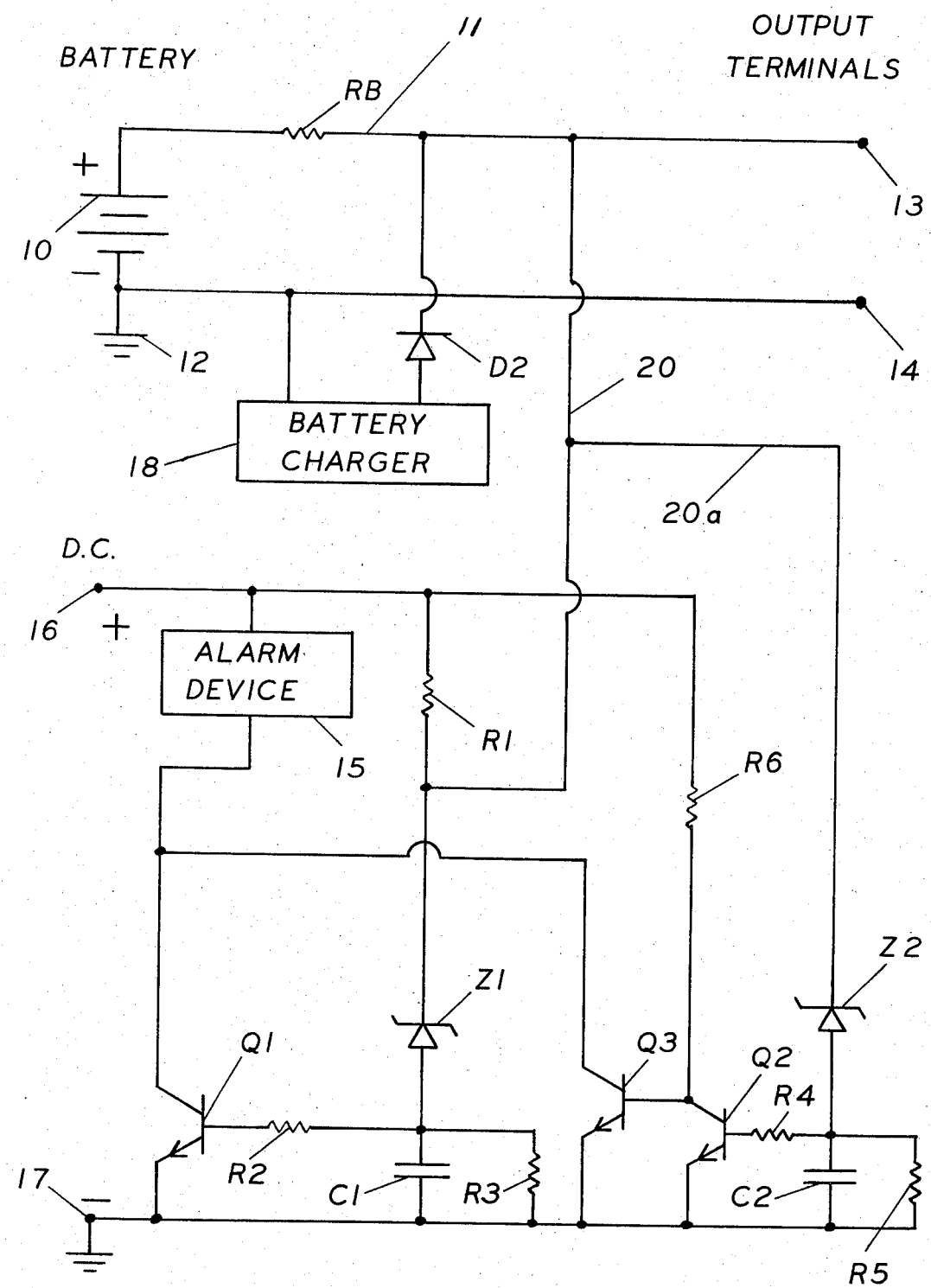

SUPERVISED BATTERY POWER SUPPLY

The present invention relates to a supervised battery power supply circuit particularly suitable for use in a fire alarm system or the like.

It has long been the practice in fire alarm, burglar, and other protective systems operated by electric power systems, to provide back-up, or emergency battery systems, to assure operation of the protective system in the event of an outage of the main electric power system. In such systems supervisory circuits have been provided to detect the failure or low voltage of the main electric power system. However, in the design of most of such protective systems no consideration has been given to supervision of the presence or condition of the emergency battery power supply. This is of particular concern particularly in cases in which the batteries are located remotely from the alarm panel. Obviously, it is very important to know that the batteries are in place, connected to the alarm system, and of adequate terminal voltage.

In accordance with the present invention supervision is had of the presence of batteries connected to the systems thereby providing a trouble or alarm signal if the batteries are removed or if leads connected to the batteries are broken, or if the internal resistance of the battery increased due to aging. In accordance with an additional aspect of the invention a trouble signal alarm is produced if the battery voltage drops below an acceptable voltage level needed for supplying power to the system. Also a trouble signal may be provided in the event of a short in a battery cell resulting in a reduction of acceptable terminal voltage of the battery.

The construction in accordance with the present invention incorporates a battery, an alarm device, and a control circuit including a control potential source. The battery is connected in series with a voltage dropping resistor to the control circuit in parallel with a portion thereof across the control potential source. Therefore a portion of the current passed through the voltage dropping resistor by the control potential is passed through the battery. By reason of the potential drop in the voltage dropping resistor the control potential is insufficient to exceed a zener diode voltage to actuate the alarm device. In the event the battery circuit becomes open-circuited or the battery internal resistance increases the effect is an increase in resistance in the battery circuit and results in a reduction in current through the voltage dropping resistance so that a larger potential is available to exceed the zener voltage and actuate the alarm device. The circuit is operative irrespective of whether or not a battery charger is connected thereto if a blocking diode is included in the charging circuit to prevent the passage of control current therethrough. Supervision is had of the under voltage condition of the battery by incorporating another sensing circuit supplied through the voltage dropping resistor.

The single FIGURE of the drawing shows a schematic circuit in accordance with the invention.

Referring to the drawing there is shown a battery 10 having a pair of terminals 11 and 12 respectively connected to output terminals 13 and 14, battery terminal 12 being grounded. The internal resistance of the battery 10 is indicated by RB. An alarm device 15 is connected in series with the collector circuit of a transistor Q1 across a direct current control potential applied to the terminals 16 and 17. The transistor Q1 is biased through a voltage dropping resistor R1 connected in series with a zener diode Z1 and a capacitor C1 connected across the direct current control potential. A base resistor R2 is connected between the base of the transistor Q1 and the connection between the zener diode Z1 and the capacitor C1. R3 is a discharge resistor for capacitor C1. A battery charger 18 is connected across the terminals of the battery 10 in series with a blocking diode D2. The battery 10 is connected by a lead 20 to the connection between the voltage dropping resistor R1 and the cathode of the zener diode Z1.

In the circuit shown the voltage of the battery 10 is normally less than the voltage across the direct current control supply 16 and 17. Thus under normal operation current flows through the resistor R1 through the lead 20 and the battery 10 returning through ground to the control voltage terminal 17. A normal battery will present near zero impedance to the current through the resistor R1. As long as the battery condition remains satisfactory the voltage between the cathode of the zener diode Z1 and ground will remain well below the zener voltage and the zener diode Z1 will not conduct, the capacitor C1 will remain uncharged, and the transistor Q1 will remain OFF and the alarm device 15 will be inoperative.

When the battery 10 is removed or its leads become opened, or the resistance of either increases, the current through the voltage dropping resistor R1 will drop resulting in an increase in the voltage at the cathode of the zener diode Z1 causing it to conduct and apply voltage to the capacitor C1 for the charging thereof. The transistor Q1 is turned ON energizing the alarm device 15. The circuit will remain in this state until the open or high resistance condition of the battery circuit is corrected so that there is again a sufficiently high voltage drop across the voltage dropping resistor R1 to prevent conduction of the zener diode Z1. The capacitor C1 then becomes discharged so that the transistor Q1 discontinues the energization of the alarm device 15.

It should be noted that the circuit so far described is operative irrespective of whether or not the battery charger 18 is connected in the circuit as in the absence of the battery 10 the blocking diode D2 prevents current flow back into the battery charger through the lead 20 and the voltage dropping resistor R1.

For the purpose of supervising the conditions such as an undervoltage of the battery, or the shorting of the battery, or its leads, additional stages are added to the control circuit incorporating transistors Q2 and Q3, resistors R4, R5 and R6, and capacitor C2. In this circuit the transistor Q2 is normally turned ON and the transistor Q3 is normally OFF. A zener diode Z2 has its cathode connected to the battery terminal through lead 20a, while the anode of zener Z2 is connected through a capacitor C2 to ground (by-passed by the resistor R5) and through the resistor R4 to the base of the transistor Q2. Under normal operation while the battery is in a charged condition with its voltage above the predetermined voltage of the zener Z2, the zener conducts and holds the transistor Q2 ON and the transistor Q3 OFF. Upon a drop in the battery voltage the transistor Q2 is turned OFF and the transistor Q3 is biased ON through the resistor R6 so that a trouble alarm is given.

It should be noted that although the control potential across the terminals 16 and 17 has been shown as direct current it alternatively might be half wave rectified direct current. In the event the control potential is direct current the capacitors C1 and C2 may be omitted. The alarm device 15 includes a relay coil as is usual.

In a working embodiment of a circuit in accordance with the invention the following circuit constants were used:

| | |
|---|---|
| Direct current control voltage | 35 volts |
| Battery | 24 volts |
| Battery charger voltage | 35 volts |
| Resistor R1 | 5K ohms |
| Resistor R2 | 1K ohms |
| Resistor R3 | 5K ohms |
| Resistor R4 | 1K ohms |
| Resistor R5 | 5K ohms |
| Resistor R6 | 5K ohms |
| Capacitor C1 | 10 mfd |
| Capacitor C2 | 10 mfd |
| Transistor Q1 and Q2 | NPN |
| Zener diode Z1 | 30 volts |
| Zener diode Z2 | 20 volts |

While the invention has been described and illustrated with reference to a specific embodiment thereof it is to be understood that other embodiments may be resorted to without departing from the invention. For example, although the supervised power supply has been referred to as a battery, it is to be understood that within the skill of the art other power supplies may be utilized, as fuel cells, generators, or separate system supplies. Therefore, the form of the invention set out above should be considered as illustrative and not as limiting the scope of the following claims.

We claim:

1. A supervised battery power supply circuit comprising a battery of one potential, a pair of output terminals for said battery, an alarm device, a control circuit for said alarm device, voltage dropping means, and a second source of direct current of greater potential than said one potential connected to supply said control circuit through said voltage dropping means and normally effective to cause actuation of said alarm device, said battery connected in series with said voltage dropping means and in opposition with said second source of direct current thus increasing current flow through said voltage dropping means to produce increased voltage drop thereover under normal voltage conditions so that the voltage drop is insufficient for actuation of said alarm device and an increase in the resistance of the battery circuit results in decreased voltage drop over the voltage dropping means so that the voltage is sufficient for actuation of said alarm device, whereby the condition of said battery is supervised by the actuation of an alarm upon the occurrence of an increase in resistance or open circuit of said battery or its leads.

2. A supervised battery power supply circuit according to claim 1 in which a battery charger is connected to said battery through a current blocking diode so that upon the occurrence of an open circuit of said battery current flow is blocked from said control circuit to said charger.

3. A supervised battery power supply circuit according to claim 1 in which said voltage dropping means is a resistor.

4. A supervised battery power supply circuit according to claim 1 in which said control circuit includes a zener diode of higher zener voltage than the voltage of said battery connected in series with said voltage dropping means and switching means for said alarm device so that said alarm device is actuated if the zener voltage is exceeded such as would occur under an increase in resistance of the battery.

5. A supervised battery power supply circuit according to claim 1 in which is included a zener diode of lower zener voltage than the voltage of said battery, and a second control circuit is provided controlled by said zener diode, whereby said alarm device is actuated in the event the battery voltage becomes less than said zener voltage.

6. A supervised battery power supply circuit according to claim 1 in which said control circuit includes a transistor biased from said second source of direct current through a series connected zener diode and resistor with the junction between said zener diode and said resistor connected to the base of the transistor.

7. A supervised battery power supply circuit according to claim 1 in which said battery charger is connected to said battery through a current blocking diode, in which said control circuit includes a second source of direct current, a zener diode of higher zener voltage than the voltage of said battery connected so that said alarm device is actuated by said second source of direct current if the zener voltage is exceeded, and in which is included a second zener diode of lower zener voltage than the voltage of said battery, and a second control circuit controlled by said second zener diode from said second source of direct current so that said alarm device is actuated in the event the battery voltage becomes less than said second zener voltage.

* * * * *